(12) United States Patent
Cioccarelli

(10) Patent No.: US 7,305,375 B2
(45) Date of Patent: Dec. 4, 2007

(54) METHOD AND SYSTEM FOR DISTRIBUTED REMOTE RESOURCES

(75) Inventor: Dominic Cioccarelli, Mosman (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 601 days.

(21) Appl. No.: 10/420,915

(22) Filed: Apr. 23, 2003

(65) Prior Publication Data

US 2004/0215602 A1    Oct. 28, 2004

(51) Int. Cl.
G06F 17/30    (2006.01)
G06F 15/16    (2006.01)

(52) U.S. Cl. .............................. 707/1; 707/3; 709/219

(58) Field of Classification Search .................... 707/1, 707/100, 101, 3; 709/201, 223, 216, 219, 709/230
See application file for complete search history.

(56) References Cited

U.S. PATENT DOCUMENTS 7,003,555 B1 * 2/2006 Jungck ....................... 709/219
7,209,973 B2 * 4/2007 Tormasov et al. ........... 709/231
2003/0167392 A1 * 9/2003 Fransdonk ................... 713/156
2005/0198292 A1 * 9/2005 Duursma et al. ............ 709/225

* cited by examiner

Primary Examiner—Don Wong
Assistant Examiner—Marcin Filipczyk

(57) ABSTRACT

A method for locating and retrieving distributed remote resources. A request (2) for a resource is received by a server (3). The request may be received from another server or from a user device (1). The request may include an identifier for the resource in the form of a Uniform Resource Name. The server (3) searches for the resource in a local storage device (4). If the resource is found the server may send access information for the resource or the resource itself to the original requester. If the server (3) cannot locate the resource on the local storage device (4) it will send the request to a plurality of servers (5, 8, 13). These servers may be those on a list (24) of neighbouring servers or those accessible by sending (35) the request via a multicast method. A server and system for implementing the method are also disclosed.

22 Claims, 3 Drawing Sheets

METHOD AND SYSTEM FOR DISTRIBUTED REMOTE RESOURCES

FIELD OF INVENTION

The present invention relates to a method and system for locating and retrieving distributed remote resources. More particularly, but not exclusively, the present invention relates to a method and system for implementation of a network protocol for the location and retrieval of a resource from multiple copies of the resource distributed over servers in a network.

BACKGROUND TO THE INVENTION

Today a large amount of superfluous traffic exists on the Internet due to the fact that users generally download resources from locations that are further away than the closest identical copy of that same resource.

One common solution to distributed resource (typically file) publication is to use a system of mirrors. A mirror is a complete copy of an entire site (normally an FTP [File Transfer Protocol] site) in another location. The advantage of a mirror is that it provides users who are a long way from the original site quicker access to files. The problem with mirrors is that they rely on the fact that users are aware of their existence. To counter this problem many "mirrored" FTP servers such as Tucows (www.tucows.com) or Sunsite (www.sunsite.com) use a web front end that provides a single entry point. They then ask the user to choose their location and forward them to their closest mirror.

The problem with such approaches is that they are non-standard and thus require a significant development on the part of the mirror owners and they are manual in that users have to manually navigate to the closest mirror. The other problem is that even after navigating to a particular mirror, a user is not guaranteed to find the resource that they require. Finally, such approaches are not dynamic—if a particular mirror is heavily loaded, it may be more efficient to be routed to a mirror which is slightly further away but less heavily loaded.

Another more recent approach is a technology which has come to be known as Peer to Peer (P2P). In this technique a central server is used which contains a list of all resources found on all the clients which are currently on line. If one of the clients requires a file which is located on another client, the P2P server will broker the request, effectively putting the requester in contact with the supplier.

Better P2P products take account of network and client loads in their brokering algorithms, but still have significant drawbacks. The major drawback is that a centralized directory is used for brokering—resulting in a significant reduction in scalability and reliability. Furthermore, P2P solutions don't distinguish between clients and servers, which effectively means that they must serve as well as be served. This socialistic approach, whilst valid for some domains, is not necessarily the ideal approach for secure, reliable delivery of commercial resources.

Due to the inefficiency and wastefulness of common Internet protocols an efficient resource location and retrieval protocol is required.

It is an object of the present invention to satisfy some of the above requirements.

SUMMARY OF THE INVENTION

According to a first aspect of the invention there is provided a method for handling requests for a resource including the steps of:
  i) receiving a request for a resource;
  ii) searching for the resource in a local storage device; and
  iii) where the resource is not found in the local storage device the request for the resource is sent to a plurality of servers.

In this way a user may be put in contact with the closest version of the resource that they require, thereby potentially reducing download times and superfluous Internet traffic.

The plurality of servers to which the request for the resource is sent may be selected from a list of neighbouring servers.

Alternatively, the plurality of servers to which the request is sent may include servers which are accessed by the sending of the request using a multicast method such as the IP Muiticast protocol.

Alternatively, the plurality of servers to which the request is sent may include both those servers selected from a list of neighbouring servers and those servers accessed when sending the request via a multicast method.

When the request is sent using the IP Multicast protocol it is preferred that the range of the multicast is limited. It is preferred that the range is limited by setting a time-to-live (TTL) within the multicast message restricting the number of routers through which the message may pass.

Preferably the request originates from a user device. It is preferred that, when the resource is found on the local storage device access information for the resource, the IP address of the server from which the local storage device is accessed for example, is sent back to the user device. It is preferred that this access information is transmitted to the server to which the user device initially transmitted the request for the resource and this server may control whether the access information is forwarded on to the user device.

It is preferred that the request is composed of the IP address of the server which initially received the request and a Uniform Resource Name (URN) identifying the resource. The URN may be composed of the name of the identity who created the resource (for example the organisation or person), the type of the resource (for example the MIME-type), the name of the resource, and version details about the resource (for example major/minor version numbers).

According to a further aspect of the invention there is provided a server for handling requests for resources according to the above described methods.

According to a further aspect of the invention there is provided a system for retrieving a resource including:
  i) a client device adapted to send a request for a resource to an initial server being one of a plurality of servers and adapted to receive the address of the resource from one of the plurality of servers; and
  ii) one of the plurality of servers adapted to receive a request from a client device, to access a storage device to search for the resource, and to transmit access information for the resource to the client device;
  wherein the one of the plurality of servers is adapted to transmit the request to neighbouring servers being two or more of the plurality of servers when the resource is not found on the storage device.

The neighbouring servers may include those servers on a list of neighbouring servers stored by the server. The neighbouring servers may include those accessible by transmission of the request using a multicast method such as the IP Multicast protocol.

When the IP Multicast protocol is used to transmit the method it is preferred that the scope of the transmission is limited. It is preferred that this limitation is implemented by restricting the number of routers through which the request may travel.

It is preferred that the initial server is one of the plurality of servers which is more efficiently accessed in relation to the other servers. The efficiency may be measured by closeness in terms of network topology, by differences in bandwidth, by the speed of request processing, or by any other network or server measurement.

Preferably, the servers which have a copy of the resource on the storage device accessed by them transmit access information for the resource to the initial server and when requested by the initial server, or the client device, transmit the resource to the initial server or client device.

According to a further aspect of the invention there is provided a method of data communication for transmitting a request for a resource by transmitting a message which includes:
i) the IP address of an originating server which first received the request from a user device; and
ii) a Uniform Resource Name for the resource.

Preferably, the Uniform Resource Name (URN) is composed of the name of the identity who created the resource (for example the organisation or person), the type of the resource (for example the MIME-type), the name of the resource, and version details about the resource (for example major/minor version numbers).

The message may include a universal identifier generated by the originating server.

The message may include at least some of the IP addresses of the servers which have transmitted the request.

The message may include a time-to-live (TTL) parameter set by the originating server which is to be decremented by each server which transmits the request.

BRIEF DESCRIPTION OF THE DRAWINGS

Embodiments of the invention will now be described by way of example only with reference to the accompanying drawings in which.

DETAILED DESCRIPTION OF PREFERRED EMBODIMENTS

Figure 1:
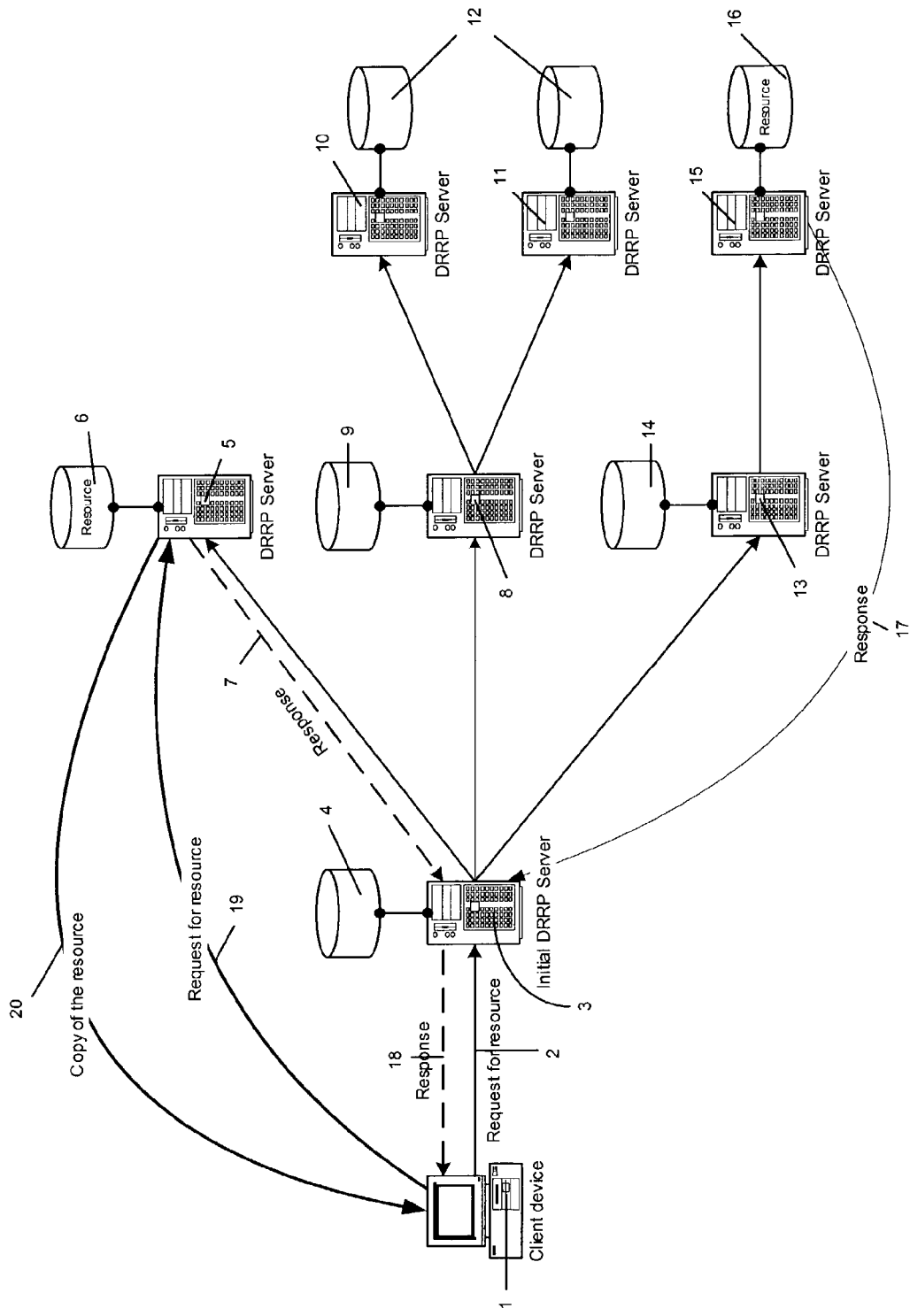
FIG. 1: shows a block diagram of a distributed computer network to implement the method.

The present implementation, referred to herein as the Distributed Remote Resource Protocol (DRRP), relates to a method and system to enable clients to be put in contact with the closest available copy of the resource that they require.

DRRP will typically be used in applications where content or other resources must be made available to people who are distributed over a large geographical area. This includes applications such as international web sites where the same content must be provided to people in many countries but would typically be for file distribution, such as distribution of software patches, drivers, documents or images.

Another possible application of DRRP is a software installation system where a user turns on a brand new computer and selects the software that they want to install. The computer will communicate with its local DRRP server to locate, download and install the required software.

The method will now be described.

The DRRP client connects to their local DRRP server (initial DRRP server). This establishes a DRRP session. The clients may need to authenticate themselves in order to connect to the DRRP server, although this depends on how the server is configured. For DRRP servers inside an intranet for instance, no authentication may be necessary. Normally the IP address or name of a clients local DRRP server will be defined by an ISP or system administrator in much the same way as a local SMTP server is defined in present systems. The client requests a resource. The resource is defined by a unique URN (Uniform Resource Name).

The resource can be an application such as a Java application, a data file such as a text file or image file, or a web page. The resource can be any electronically stored data.

The URN may contain, for instance:
The reverse domain name of the company which originally produced the resource, as opposed to the domain name of the company hosting the resource.
The resource type, for example the MIME type of the resource.
The resource name. It is envisaged that the parent company would be responsible for name space clashes within its own domain.
a resource sub name which can be used for sub-components of an application or for chapters of a book, for instance.
The resource major version number.
The resource minor version number.
Some examples of DRRP URNs are:
drrp://com.hp.openview/application:java/servicedesk/client/4/5
Where: openview.hp.com is the domain name of the originating company
application:java is the MIME type of the resource
servicedesk is the resource name
client is the resource subname
5 is the major version number
4 is the minor version number
drrp/lcom.oreilly/application:pdf/java in a nutshell/1/0
Where: oreilly.com is the domain name of the originating company
application:pdf is the MIME type of the resource
java in a nutshell is the resource name
1 is the major version number
0 is the minor version number If the DRRP server contains the resource defined by the URN the resource is transmitted to the client and the session is closed.

If, on the other hand, the server doesn't have a local copy of the URN, it will propagate the request to neighbouring DRRP servers.

This can be done using one or both of the following two propagation techniques:
i) The first technique involves the DRRP server containing a list of all neighbouring DRRP servers. This list will be typically defined and maintained by the DRRP server administrator.
The DRRP request will be simultaneously sent to all listed servers.

ii) The second technique uses IP Multicast. This approach is similar to the static approach defined above, except in this case no manually defined list of neighbouring DRRP servers is used. Instead, the inherent ability of IP Multicast to send a message to multiple machines simultaneously is exploited. This approach could be even more efficient than the static approach as those machines that receive the request first (and therefore respond first) will typically be those who are closest in terms of the network topology at the time when the request was made.

DRRP servers using IP multicast will typically set a multicast time-to-live (DTTL) at an appropriate level to prevent the resource request from reaching too many servers.

It will be appreciated by those skilled in the art that any suitable propagation technique similar or comparable to IP multicast may be used.

It is preferred that the method is implemented over TCP/IP.

The DRRP request will contain at least the IP address of the initial DRRP server and the URN of the requested resource.

In order to increase the efficiency of the method by preventing DRRP servers processing multiple identical requests in some implementations the DRRP result can contain one or more of the following elements:

i) A universal Identifier (UID) which has been generated for each DRRP request from the initial DRRP server. This UID is stored in the DRRP request header. If any DRRP server received a DRRP request with the same UID as a previous request, it will ignore this as it has already dealt with this request.

This prevents a DRRP server processing the same request from multiple "lower level" DRRP servers.

ii) When a DRRP server propagates a DRRP request, it will append its address and that of all its neighbours to the DRRP header. In this way, if another DRRP server receives the request, it will know of at least some of the servers that have already processed the request and will not propagate it to them.

ii) A DRRP time-to-live parameter (dTTL) added to the DRRP header. Each node, that is each DRRP server, will decrement this counter until it reaches zero in which case the request is no longer propagated.

This may lead to a situation in which an existing resource isn't found.

To resolve this in one implementation of the invention some DRRP servers randomly "reset" the dTTL, e.g. if a DRRP server is forwarding a request to 10 neighbouring DRRP servers, it may choose to reset the dTTL for 2 of the 10 sub nodes, which will allow the request to be propagated further from these 2 nodes.

If one of the neighbouring servers has the requested resource, then it will return its IP address to the initial DRRP server.

The neighbouring DRRP servers which do not have the requested resource will propagate the request using one or more of the two propagation techniques described above for instance, to their neighbouring DRRP servers, except the DRRP server from which they received the request, and the process will continue.

Eventually a server will be found which has the requested resource. This server will transmit its IP address back to the initial DRRP server. The initial DRRP server may either discard the address if a suitable server has already been found or pass the request back to the client When the initial DRRP server passes the IP address of the DRRP server which has the requested resource back to the DRRP client, the DRRP client will establish a session with that server and retrieve the resource.

When the resource has been retrieved the client will close their session with the server, In some cases, the client may specify a timeout, at the expire of which, without receiving a response, the client concludes the resource cannot be retrieved and closes the session with the server.

The server can also impose a timeout at the expire of which, without receiving responses from DRRP servers, it may disconnect the client. Addresses of servers containing resources that are received after a timeout will be discarded as the concerned client has been disconnected. This information may, however, be used by the server for instance to update caches mapping URNs to server addresses.

The servers may all be within an LAN, a WAN, an intranet system, or the Internet.

It will be appreciated that the method may be deployed on wired networks, wireless networks or a combination of both types.

DRRP lends itself particularly well to caching. DRRP servers may notice that their clients request particular resources frequently and therefore decide to store a copy of that resource locally. They could also use a history of which servers responded to requests for a given URN to automatically route clients to that server without needing to broadcast the request. In this case, it would be prudent to check the cached data frequently to ensure that the chosen server was consistently the best at responding to the given URN. The chosen server could become heavily loaded or a newer, closer, server may be introduced, for instance.

EXAMPLES

With reference to FIG. 1 an example of locating and retrieving a resource will now be described.

A client device 1 requests 2 a resource from its local DRRP server 3. This local DRRP server 3 will be referred to as the initial DRRP server in the following. It is preferred that the client device is a user device.

The local database 4 for server 3 does not contain the resource so server 3 propagates the request to other servers. Server 5 contains the resource within its local database 6 and sends a response 7 to the initial DRRP server 3. Server 8 does not contain the resource within its local database 9 and therefore propagates the request to other servers. Servers 10 and 11 receive the propagated request from Server 8 but neither have the resource in their local databases 12. Server 13 receives the propagated request from the initial DRRP server 3. It does not have the resource in its local database 14 and propagates the request to other servers. The only server that receives this propagated request is server 15. This server has the resource stored in its local database 16 and transmits a response 17 to the initial DRRP server 3.

Server 3 transmits 18 the first response received back to the client device 1. In this example the first response received is from Server 5. The client device 1 connects to Server 5 and requests 19 a copy of the resource. Server 5 transmits 20 a copy of the resource to the client device 1.

Figure 2:
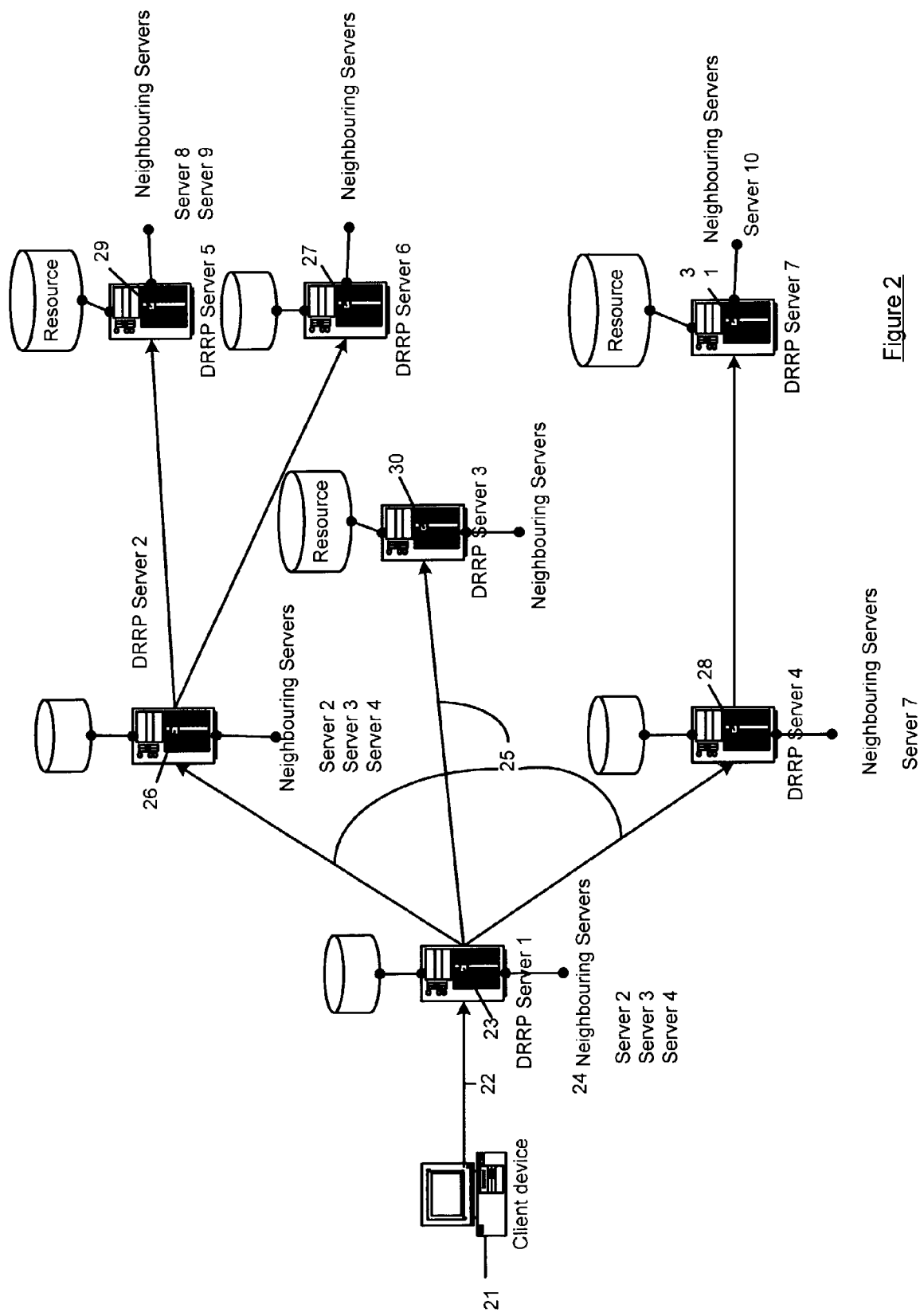
FIG. 2: shows a block diagram illustrating the operation of a first propagation technique—utilising a local list of neighbouring servers.

With reference to FIG. 2 an example of how the a propagation technique in which the list of neighbouring servers is stored on each DRRP server operates to locate a resource is described.

The client device 21 sends a request 22 for a resource to the initial DRRP server 23. As server 23 does not have the resource stored on its local database it uses a list 24 of neighbouring servers stored locally to determine which servers to transmit the request to. Server 23 subsequently transmits 25 the request to all the servers on the list (26, 28 and 30). It will be appreciated that the method may be implemented so as to propagate the request only to some of the servers on the list.

Servers 26 and 28 do not have the resource on their local databases and will propagate the request on to the servers stored in their lists of neighbouring servers (servers 29 and 27 and server 31 respectively).

Servers 29, 30 and 31 have the resource stored on their local database and will not propagate the request. It is preferred that a server that has the resource transmits a response Including that server's IP address back to the initial DRRP server 23. Server 23 may then transmit one of the IP addresses back to the client device 21. It is preferred that the server 23 transmits the first IP address it receives. However, in some implementations of the method the server 23 may transmit an IP address dependent on information provided within the response, which can include that server's (29, 30 or 31) user load and bandwidth data.

If the client device receives the IP address of a server it is preferred that the client device subsequently submits a download request for the resource directly to the server at that IP address.

Figure 3:
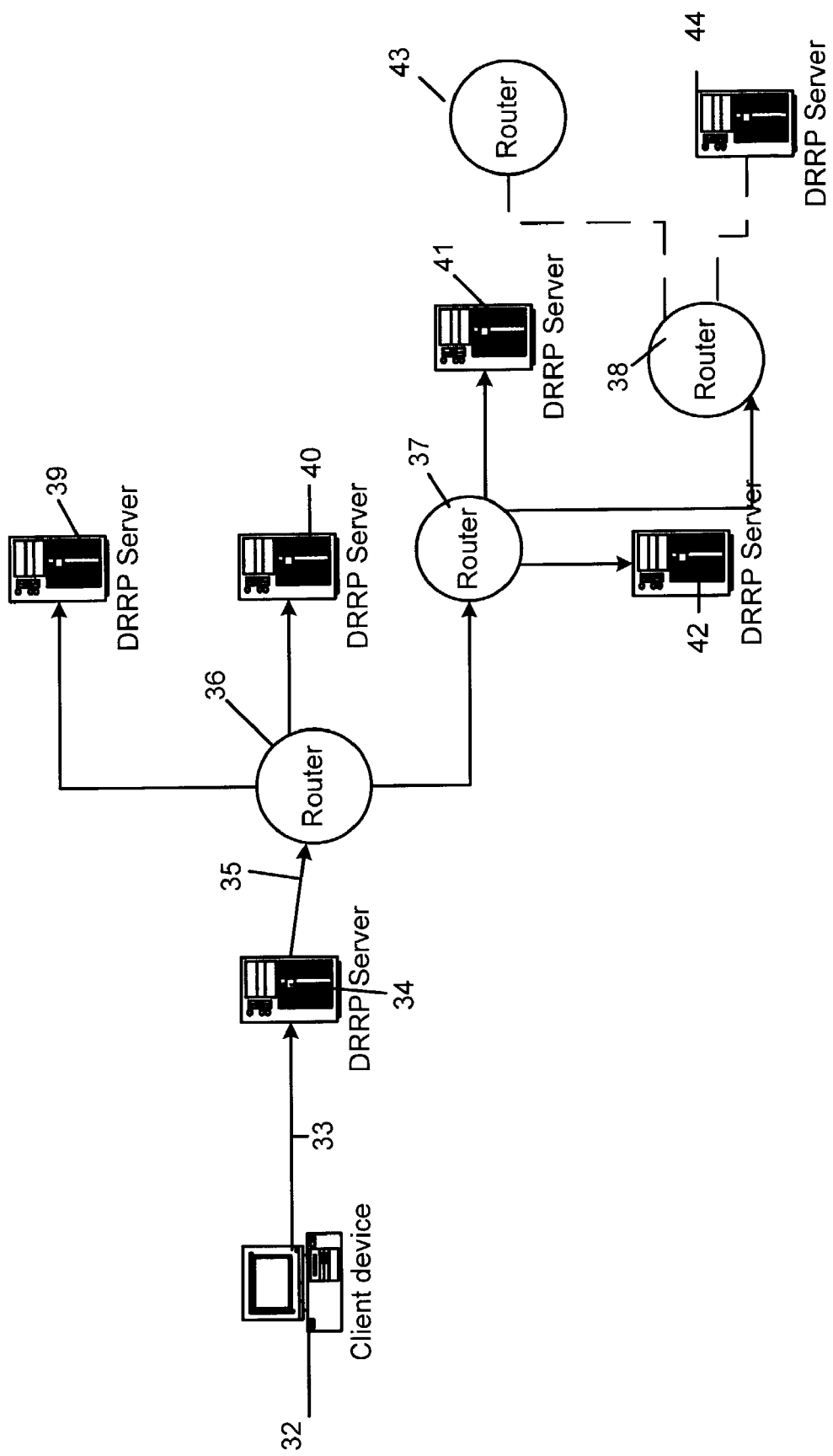
FIG. 3: shows a block diagram illustrating the operation of a second propagation technique—utilising the IP Multicast protocol.

With reference to FIG. 3 an example of how the second propagation technique—IP Multicast—operates to locate a resource is given.

The client device 32 sends a request 33 for a resource to the initial DRRP server 34. Server 34 sends the request out as a multicast message 35. In this example server 34 has set the time-to-live (TTL) to three. It will be appreciated that the TTL may be set to any number.

The IP Multicast message will be propagated automatically by routers 36, 37, and 38 and will go to every DRRP server 39, 40, 41, and 42 and routers 37 and 38 attached to those routers. Each router that receives the multicast message will decrement the TTL, within the multicast message before it is transmitted, by one. The last router 38 will not transmit the multicast message to attached router 43 or server 44 because the TTL has reached zero.

It will be appreciated by those skilled in the art that any suitable multicast method may be used.

In some cases the routers may not support the IP Multicast protocol. In order to transmit the requests to servers that are blocked by such routers one implementation of the method utilises the first propagation technique—the list of neighbouring servers—in addition to the second propagation method, so that the blocked servers will eventually receive the request via a unicast from at least one of the servers propagating the request.

Servers which contain a copy of the resource will transmit responses containing their IP addresses to the server 34. The server 34 will transmit the, preferably, first response received to the client device 32 which will connect to that server and obtain a copy of the resource.

DRRP differs from the well known FTP protocol in that if the DRRP server that the client initially accesses doesn't contain the required resource, the request will be propagated out from the initial server until it reaches a server with the resource. Therefore, DRRP has the advantage that it will locate the most local copy of a resource if it exists while FTP servers being unaware of other FTP servers around them only return a resource if they contain a local copy.

DRRP is different from P2P solutions in that it doesn't rely on a central server which maintains a database of all connected clients and which resources they contain. Such a solution introduces a single point of failure and also means that the resource requestor may need to communicate with a heavily loaded and possibly distant hub before finally being put in contact with a local content provider.

The DRRP technique is distributed; no single directory or broker is used. A DRRP client can connect to any DRRP server in order to retrieve a desired resource. DRRP helps to reduce bandwidth consumption between any two network nodes. It will be appreciated that this can result in reduced infrastructure costs. Moreover DRRP may also provide faster access to resources given the higher degree of proximity and hence lower latency.

It will be understood that the DRRP implementation has been described above purely by way of example, and modifications of details can be made within the scope of the invention.

Each feature disclosed in the description, and (where appropriate) the claims and drawings may be provided independently or in any appropriate combination.

The invention claimed is:

1. A method for handling requests for a resource within a network, the method comprising the steps of:
   receiving a request for a resource;
   searching, by an initial server, for the resource in a local storage device of the initial server;
   determining that the resource is not found in the local storage device of the initial server, and sending the request for the resource to a plurality of servers different from the initial server,
   wherein, if the request for the resource is not capable of being serviced by any of the plurality of servers, the request for the resource is sent to a plurality of neighbouring servers that are neighbours to the plurality of servers,
   wherein two or more of the plurality of servers are servers accessible by the transmission of the request from the initial server to the plurality of servers via a multicast method; and
   specifying, by a user of the user device from which the request for resource originated, a time limit for receiving the resource from when the request was output,
   wherein all network connections between the user device and the plurality of servers with respect to the request are dropped when the time limit is reached if the resource has not been provided to the user device within the time limit.

2. A method as claimed in claim 1 wherein the servers to which the request is sent are selected from a list of neighbouring servers with respect to the initial server on the network.

3. A method as claimed in claim 1 when the request originates from a user device, the method further comprising the step of:
   where the resource is found on the local storage device, sending access information for the resource to the user device.

4. A method as claimed in claim 3 wherein the request includes an IP address of the server which received the request from the user device initially.

5. A method as claimed in claim 4 wherein the request includes a Uniform Resource Name identifying the resource.

6. A method as claimed in claim 5 wherein one or more of the servers to which the request is sent are selected from a list of neighbouring servers.

7. A method as claimed in claim 6 wherein the multicast method is an IP Multicast protocol.

8. A method as claimed in claim 7 wherein the Uniform Resource Name includes:
   i) a name of an identity which created the resource;
   ii) a type of the resource;
   iii) a name of the resource; and
   iv) version details about the resource.

9. A method as claimed in claim 8 wherein the access information is sent to the user device via the initial server which received the request from the user device initially.

10. A method as claimed in claim 9 wherein the request transmitted by the IP Multicast protocol has a limited range within the network.

11. A method as claimed in claim 10 wherein the range is limited to transmission of the request through a specified number of routers.

12. A method as claimed in claim 11 wherein the resource is one of the set of a software application, a data file, and a web page.

13. A method as claimed in claim 12 wherein the servers are connected via the network which is one of the set of a local area network, a wide area network, an intranet, and the Internet.

14. A system for retrieving a resource from a network, the system comprising:
   a client device adapted to send a request for a resource to an initial server being one of a plurality of servers and adapted to receive an address of the resource from one of the plurality of servers; and
   the initial server adapted to receive a request from the client device, to access a local storage device of the initial server to search for the resource, to transmit the request to neighbouring servers with respect to the initial server, the neighbouring servers being two or more of the plurality of servers where the resource is not found on the local storage device, and to transmit access information for the resource to the client device when the resource is located at one or more of the neighbouring servers,
   wherein the neighbouring servers include servers accessible when the request is transmitted by the initial server via a multicast method,
   wherein, if the request is not capable of being serviced by any of the plurality of neighbouring servers, the request is sent to a plurality of next-neighbouring servers that are neighbours to the plurality of neighbouring servers; and
   means for receiving, by a user of the client device from which the request for resource originated, a time limit for receiving the resource from when the request was output,
   wherein all network connections between the client device and the plurality of neighbouring servers with respect to the request are dropped when the time limit is reached if the resource has not been provided to the client device within the time limit.

15. A system as claimed in claim 14 wherein the neighbouring servers include those servers on a list stored on the initial server.

16. A system as claimed in claim 14 wherein the initial server is one of the plurality of servers more efficiently accessed by the client device.

17. A system as claimed in claim 16 wherein the client device is further adapted to receive the resource from one of the plurality of servers and wherein each of the plurality of servers is further adapted to transmit the resource to the client device.

18. A system as claimed in claim 17 wherein the initial server transmits the access information for the resource to the client device via said initial server.

19. A system as claimed in claim 18 wherein the neighbouring servers include those servers on a list on the initial server.

20. A system as claimed in claim 19 wherein the multicast method is an IP Multicast protocol.

21. A system as claimed in claim 20 wherein the request when transmitted via the IP Multicast protocol has network transmission limitations associated therewith.

22. A system as claimed in claim 21 wherein the network transmission limitations are limited by specifying a number of routers through which the request can pass.

* * * * *